US007445342B2

(12) United States Patent
Garg

(10) Patent No.: US 7,445,342 B2
(45) Date of Patent: Nov. 4, 2008

(54) IMAGE PROJECTION SYSTEM FOR PERSONAL MEDIA PLAYER

(75) Inventor: Sachin Kumar Garg, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 394 days.

(21) Appl. No.: 11/288,539

(22) Filed: Nov. 29, 2005

(65) Prior Publication Data

US 2007/0121087 A1    May 31, 2007

(51) Int. Cl.
*G03B 21/30* (2006.01)
*G03B 21/14* (2006.01)

(52) U.S. Cl. .................... 353/79; 353/119; 353/122; 348/800

(58) Field of Classification Search .............. 353/39, 353/42, 43, 119, 122, 28, 29, 79; 348/747, 348/800–803, 836, 838, 839, 14.04, 14.03; 349/6, 7, 58, 60, 69
See application file for complete search history.

(56) References Cited

U.S. PATENT DOCUMENTS

| 6,637,896 | B2* | 10/2003 | Li et al. ................... 353/119 |
| 2001/0046034 | A1 | 11/2001 | Gold et al. |
| 2003/0132921 | A1* | 7/2003 | Torunoglu et al. .......... 345/173 |
| 2005/0024324 | A1* | 2/2005 | Tomasi et al. ............. 345/156 |
| 2006/0234784 | A1* | 10/2006 | Reinhorn ................. 455/575.1 |

* cited by examiner

*Primary Examiner*—Andrew T Sever
(74) *Attorney, Agent, or Firm*—Kirschstein, et al.

(57) ABSTRACT

An image projection module within a housing accessory is operative for causing selected pixels in a raster pattern to be illuminated to produce an image at different image planes of VGA quality. A personal media player is connected to the housing accessory and the image projection module to supply image signals for the image to be projected.

10 Claims, 7 Drawing Sheets

IMAGE PROJECTION SYSTEM FOR PERSONAL MEDIA PLAYER

BACKGROUND OF THE INVENTION

1. Field of the Invention

The present invention generally relates to projecting two-dimensional images such as videos at different image planes, especially using a personal media player as the video source.

2. Description of the Related Art

It is generally known to project a two-dimensional image on a screen based on a pair of scan mirrors which oscillate in mutually orthogonal directions to scan a laser beam over a raster pattern. However, the known image projection systems project an image of limited resolution, typically less than a fourth of video-graphics-array (VGA) quality of 640×480 pixels, and at a single image plane. As such, the known projection systems have limited versatility. It is also known to display an image including video on a personal media player. However, here again, the images of limited size, versatility and resolution.

SUMMARY OF THE INVENTION

Objects of the Invention

Accordingly, it is a general object of this invention to provide an image projection system that projects a sharp and clear, two-dimensional image at a plurality of different image planes.

Another object of this invention is to project images of large size.

Still another object of this invention is to project images on and off a housing accessory that contains the image projection system.

FEATURES OF THE INVENTION

In keeping with these objects and others which will become apparent hereinafter, one feature of this invention resides, briefly stated, in an arrangement for projecting a two-dimensional image, the arrangement including a housing accessory having a window, an image projection module in the housing accessory for sweeping a pattern of scan lines through the window, each scan line having a number of pixels, and for causing selected pixels to be illuminated, and rendered visible, to produce the image; and a personal media player connected to the housing accessory and the image projection module to supply image signals for the image to be projected.

In accordance with one feature of this invention, the accessory includes a panel pivotably mounted on the housing accessory for movement between one position in which the panel serves as a display screen on which the image is projected, and another position in which the panel serves as a support for supporting the housing accessory in a tilted state, thereby allowing the image to be projected onto a display surface remote from the housing. Thus, the user has the option of displaying the image on the housing accessory for private viewing of the image, or off the housing for public viewing, thereby increasing its versatility.

In accordance with another feature of this invention, the personal media player has a front side and a rear side, and the image can be projected onto either side, thereby enabling the on-board viewing to be effected at different image sizes for even greater versatility. The image can also be projected remotely from the player, thereby enabling off-board viewing to be effected at image sizes larger than the player.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
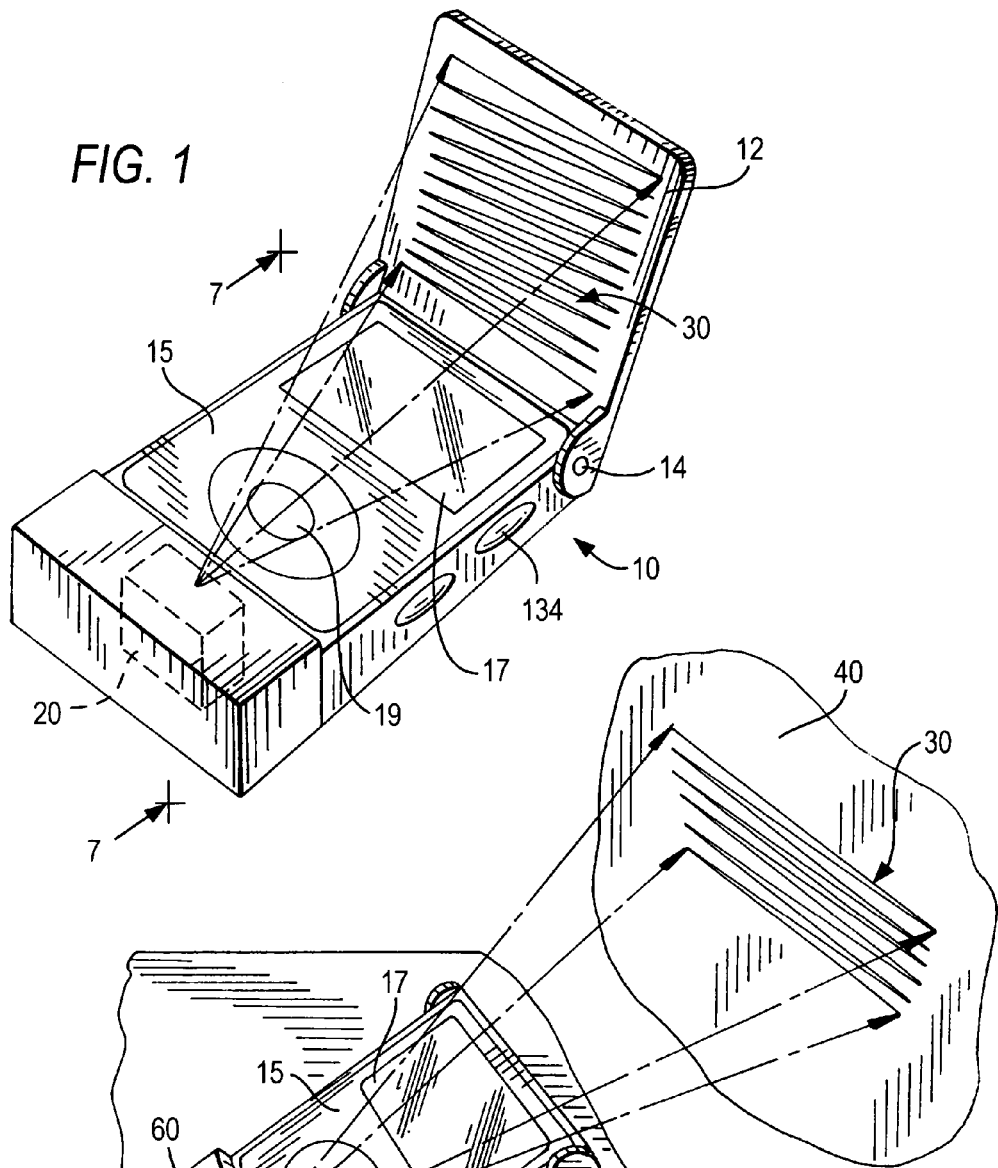
FIG. 1 is a perspective view of an arrangement for projecting an image at one image plane in accordance with this invention.
Figure 3:
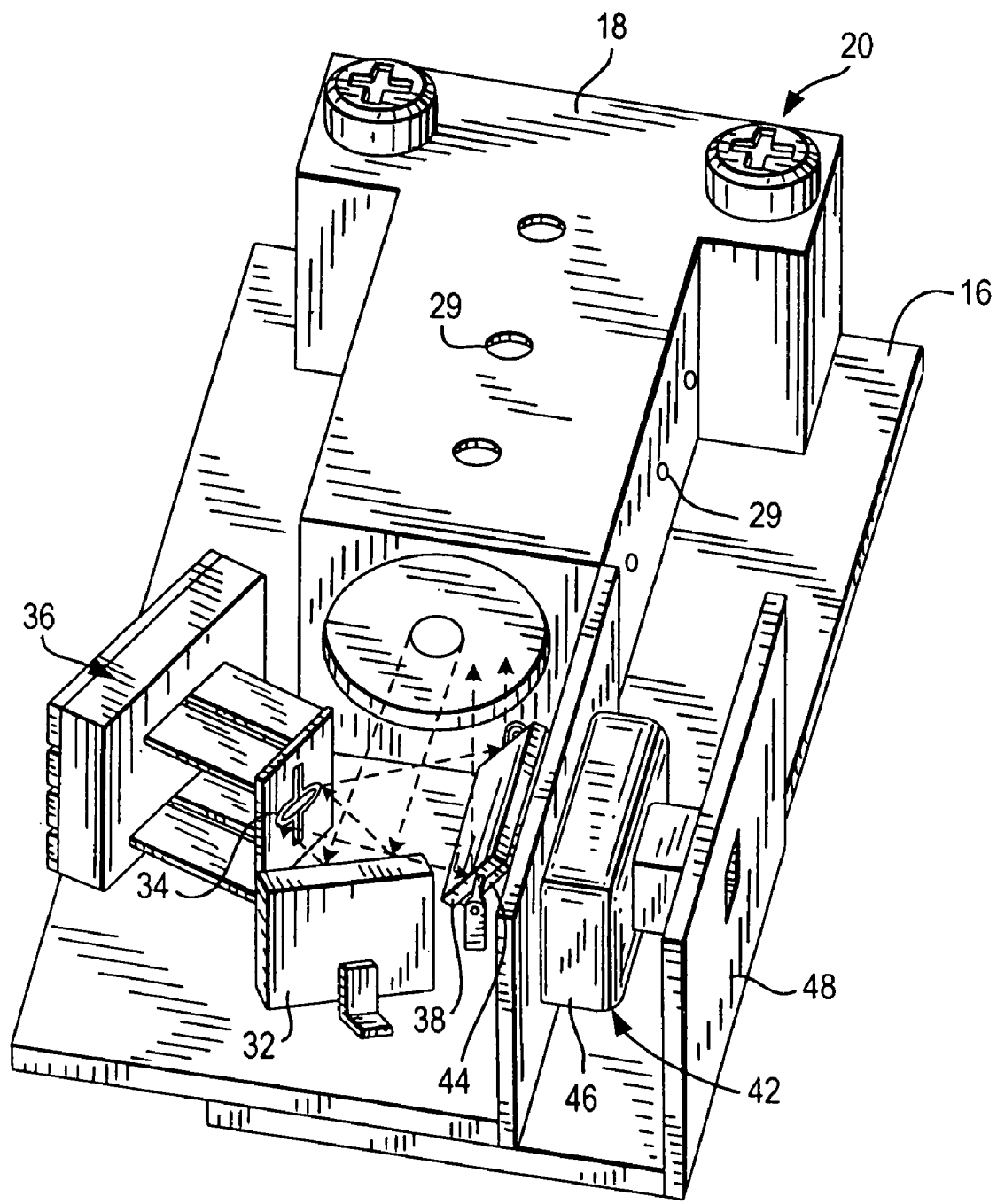
FIG. 3 is an enlarged, overhead, perspective view of an image projection module for installation in the arrangement of FIG. 1.

Reference numeral 10 in FIG. 1 generally identifies a housing accessory in which a lightweight, compact, image projection module 20, as shown in FIG. 3, is mounted. The module 20 is operative for projecting a two-dimensional image at different image planes. As described below, the image is comprised of illuminated and non-illuminated pixels on a raster pattern 30 of scan lines swept by a scanner in module 20.

The housing accessory 10 also includes a compartment in which a personal media player 15 is received. The player 15 supplies image signals, preferably video signals, to the module 20. Preferably, the player 15 is an i-pod (trademark) having a display screen 17 and a click wheel 19.

Referring to FIG. 3, the module 20 includes a support 16, for example, a printed circuit board, and a laser/optics casing 18 in which are mounted a laser 25 (see FIG. 6) and a lens assembly, including one or more lenses and preferably a pair of lenses 22, 24 operative for optically modifying a laser beam emitted by the laser 25.

Figure 6:
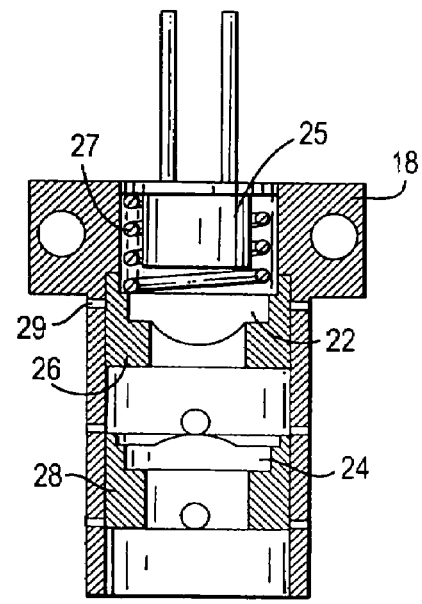
FIG. 6 is an enlarged sectional view of the laser/optics assembly of the module as taken on line 6-6 of FIG. 4.
Figure 5:
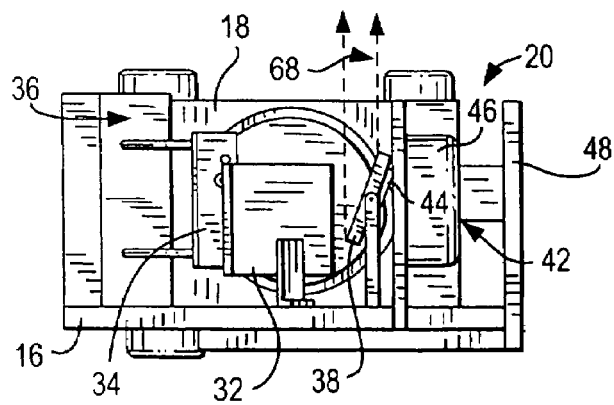
FIG. 5 is an end elevational view of the module of FIG. 2.

As best seen in FIG. 6, the laser 25 is a solid-state laser, preferably, a semiconductor laser, which, when energized, emits a laser beam having an oval cross-section. Lens 22 is a biaspheric convex lens having a positive focal length of about 2 mm and is operative for collecting virtually all the energy in the beam and for producing a diffraction-limited beam. Lens 24 is a concave lens having a negative focal length of about −20 mm. Lenses, 22, 24 are held by respective lens holders 26, 28 about 4 mm apart inside the casing 18 and are fixed in place by allowing an adhesive (not illustrated for clarity) introduced during assembly into the fill holes 29 to set. A coil spring 27 assists in positioning the laser. The lenses 22, 24 shape the beam profile.

The laser beam exiting the casing 18 is directed to, and reflected off, an optional stationary bounce mirror 32. A scanner is also mounted on the board 16 and includes a first scan mirror 34 oscillatable by an inertial drive 36 at a first scan rate to sweep the laser beam reflected off the bounce mirror over the first horizontal scan angle A (see FIG. 7), and a second scan mirror 38 oscillatable by an electromagnetic drive 42 at a second scan rate to sweep the laser beam reflected off the first scan mirror 34 over the second vertical scan angle B (see FIG. 7). In a variant construction, the scan mirrors 34, 38 can be replaced by a single two-axis mirror.

The inertial drive 36 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the module to less than one watt.

The electromagnetic drive 42 includes a permanent magnet 44 jointly mounted on and behind the second scan mirror 38, and an electromagnetic coil 46 operative for generating a periodic magnetic field in response to receiving a periodic drive signal. The coil 46 is adjacent the magnet 44 so that the periodic field magnetically interacts with the permanent field of the magnet 44 and causes the magnet and, in turn, the second scan mirror 38 to oscillate. The coil 46 is supported by an upright wall 48 connected to the board 16.

The inertial drive 36 oscillates the scan mirror 34 at a high speed at a scan rate preferably greater than 5 kHz and, more particularly, on the order of 18 kHz or more. This high scan rate is at an inaudible frequency, thereby minimizing noise and vibration. The electromagnetic drive 42 oscillates the scan mirror 38 at a slower scan rate on the order of 40 Hz which is fast enough to allow the image to persist on a human eye retina without excessive flicker.

The faster mirror 34 sweeps a horizontal scan line, and the slower mirror 38 sweeps the horizontal scan line vertically, thereby creating a raster pattern which is a grid or sequence of roughly parallel scan lines from which the image is constructed. Each scan line has a number of pixels. The image resolution is preferably VGA quality of 640×480 pixels. In some applications, a one-half VGA quality of 320×480 pixels, or one-fourth VGA quality of 320×240 pixels, is sufficient. At minimum, a resolution of 160×160 pixels is desired.

The roles of the mirrors 34, 38 could be reversed so that mirror 38 is the faster, and mirror 34 is the slower. Mirror 34 can also be designed to sweep the vertical scan line, in which event, mirror 38 would sweep the horizontal scan line. Also, the inertial drive can be used to drive the mirror 38. Indeed, either mirror can be driven by an electromechanical, electrical, mechanical, electrostatic, magnetic, or electromagnetic drive.

The image is constructed by selective illumination of the pixels in one or more of the scan lines. As described below in greater detail with reference to FIG. 8, a controller causes selected pixels in the raster pattern 30 to be illuminated, and rendered visible, by the laser beam. For example, a power controller 50 conducts an electrical current to the laser 25 to energize the latter to emit light at each selected pixel, and does not conduct an electrical current to the laser 25 to deenergize the latter to non-illuminate the other non-selected pixels. The resulting pattern of illuminated and non-illuminated pixels comprise the image, which can be any display of human— or machine-readable information or graphic. Instead of a power controller, an acousto-optical modulator could be used to deflect the laser beam away from any desired pixel to non-illuminate the pixel by not allowing the laser beam to reach the first scan mirror.

Figure 7:
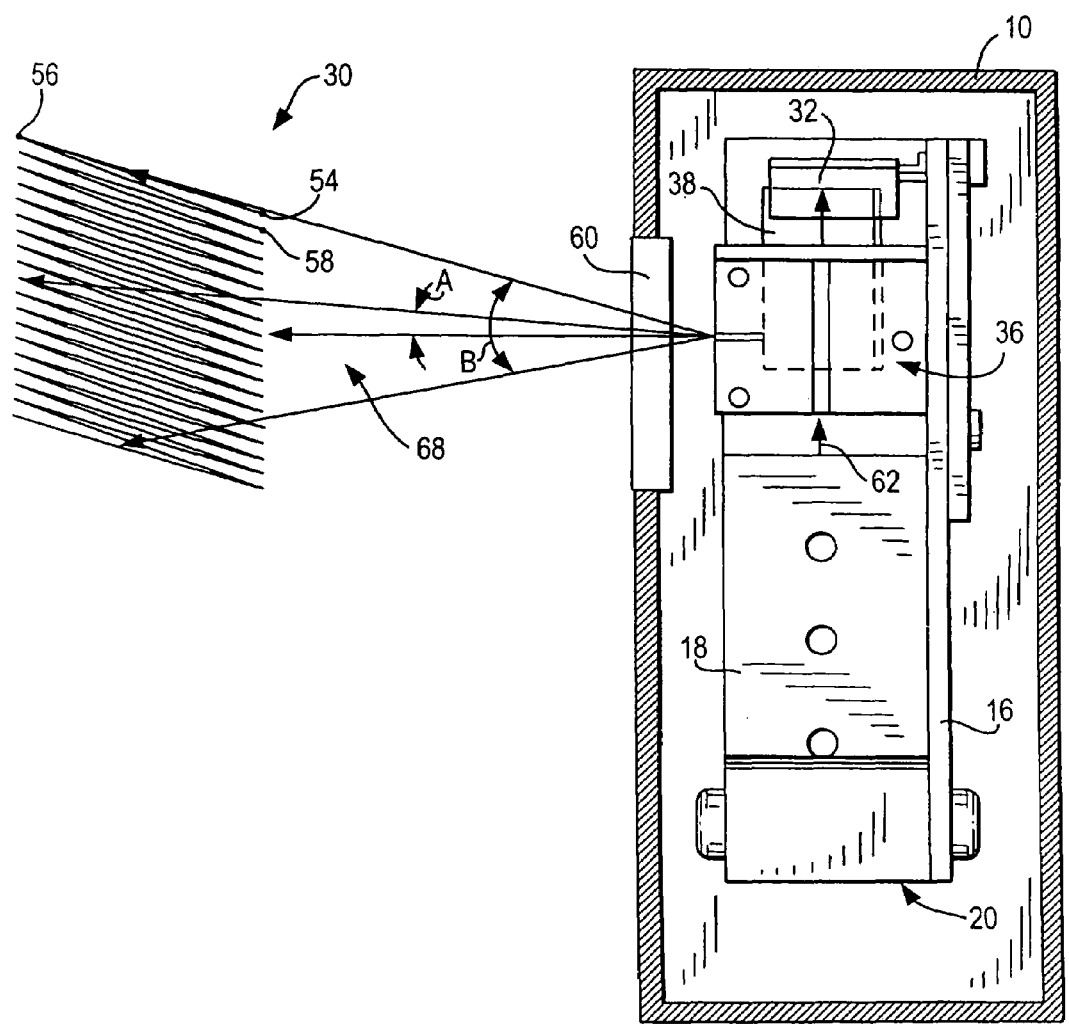
FIG. 7 is an enlarged sectional view taken on line 7-7 of FIG. 1.

Referring to FIG. 7, the raster pattern 30 is shown in an enlarged view. Starting at point 54, the laser beam is swept by the inertial drive along the horizontal direction at the horizontal scan rate to the point 56 to form a scan line. Thereupon, the laser beam is swept by the electromagnetic drive along the vertical direction at the vertical scan rate to the point 58 to form a second scan line. The formation of successive scan lines proceeds in the same manner.

The image is created in the raster pattern 30 by energizing or pulsing the laser on and off at selected times under control of a microprocessor or control circuit by operation of the power controller 50, or by maintaining the laser on and deflecting the laser beam at selected times by operation of an acousto-optical modulator. The laser produces visible light and is turned on, or its beam is properly deflected, only when a pixel in the desired image is desired to be seen. The raster pattern is a grid made of multiple pixels on each line, and of multiple lines. The image is a bit-map of selected pixels. Every letter or number, any graphical design or logo, and even machine-readable bar code symbols, can be formed as a bit-mapped image. Video is a succession of such bit-mapped images.

Figure 4:
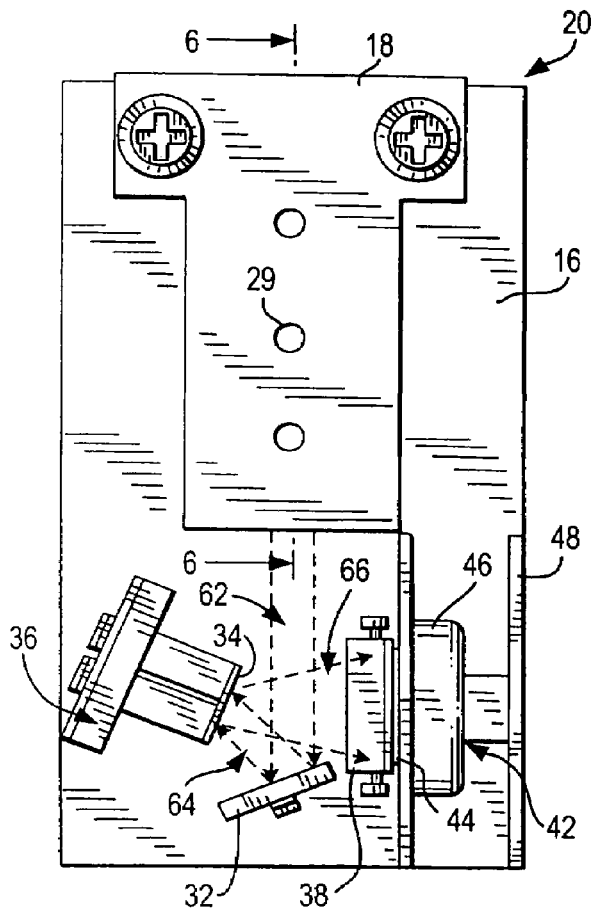
FIG. 4 is a top plan view of the module of FIG. 3.

FIG. 7 also shows a light-transmissive port or window 60 on the housing 10 and through which the image is projected in a direction generally perpendicular to the printed circuit board 16. Again, with reference to FIG. 4, the optical path of the laser beam has a vertical leg 62 between the laser/optics casing 18 and the bounce mirror 32, an inclined leg 64 toward the left to the scan mirror 34, a horizontal leg 66 toward the right to the scan mirror 38, and a forward leg 68 (see FIG. 7) in a direction toward the window 60 and perpendicular to the board 16. The image can be projected on any translucent or reflective surface, such as screen 12.

Figure 8:
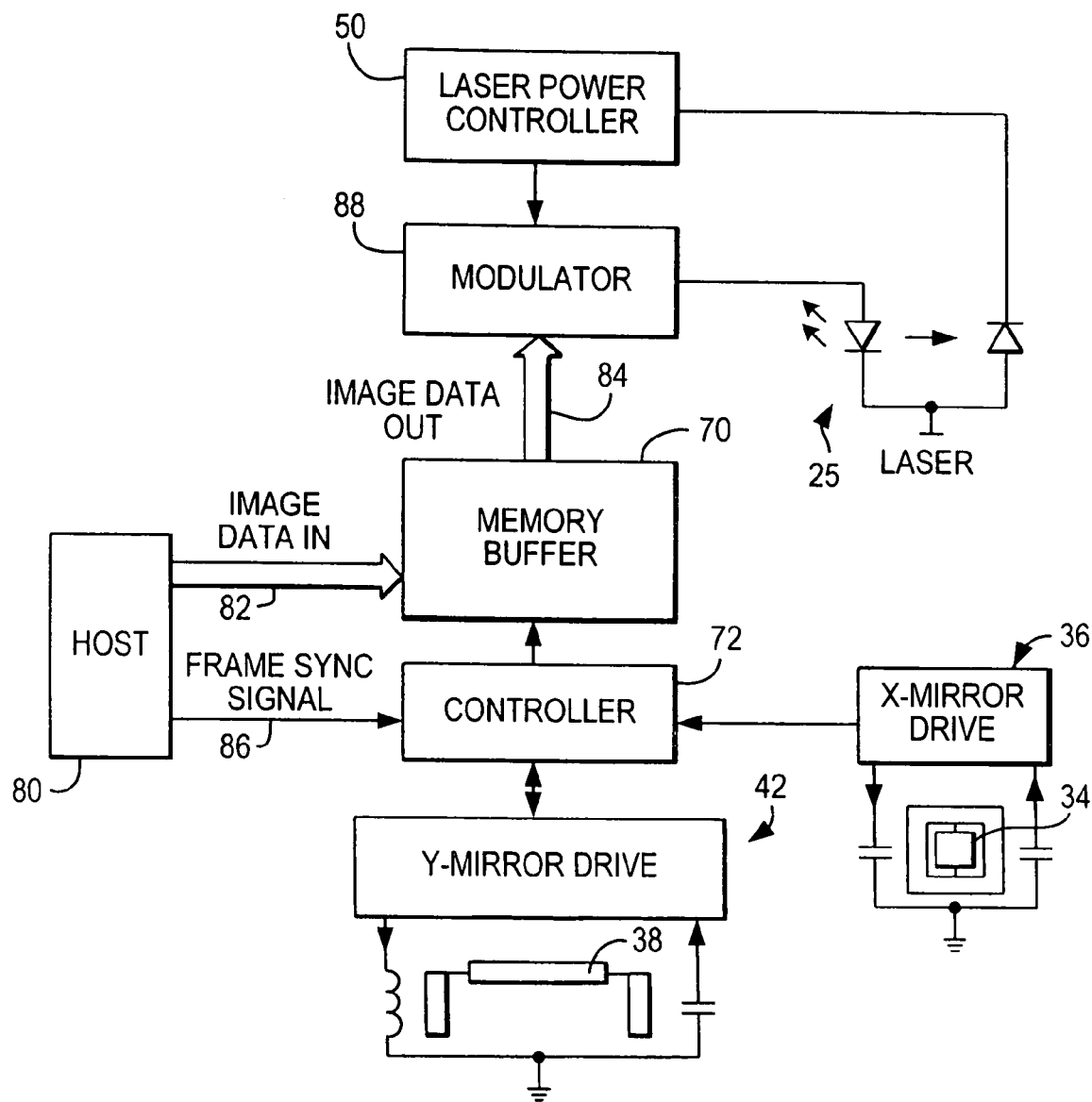
FIG. 8 is an electrical schematic block diagram depicting operation of the module of FIG. 3.

As shown in FIG. 8, a host 80 sends the bit-mapped image data 82 to a memory buffer 70 which is controlled by a memory controller 72. The storage of one full VGA frame would require about 300 kilobytes, and it would be desirable to have enough memory in the buffer 70 for two full frames (600 kilobytes) to enable one frame to be written by the host, while another frame is being read and projected. On the other hand, if the size of the buffer is smaller than a full frame, then the controller 72 can begin displaying lines after the memory has reached its maximum storage capacity with data sent by the host, or there can be simultaneous reading from and writing to the buffer. A frame synchronization signal 86 is sent by the host to the controller 72.

The first scan mirror 34, also known as the high speed or X-axis mirror, is driven by the inertial drive 36 and is controlled by the memory controller 72. Similarly, the second scan mirror 38, also known as the slow speed or Y-axis mirror, is driven by the electromagnetic drive 42 and is controlled by the memory controller 72. Since the image is projected during both forward and backward scans of the X-axis mirror, every other line of image data is displayed in reverse order. Hence, either the host has to write the image data to the buffer in the reverse order, or the memory controller has to read the image data in the reverse order.

The X-axis mirror has a sinusoidal velocity profile. In a given time interval, the laser beam sweeps more pixels in the middle of each scan line than at the ends of each scan line. To avoid image distortion, either the memory controller 72 should clock the pixels at a variable clock rate, or the host should fill the buffer 70 with data in which the size of the pixels is varied. A variable clock rate is the preferred technique since it allows pixels of a fixed size to be shared with other displays.

The output of the buffer is a digital signal 84 which is frame-synchronized with the host, and clock-and line-synchronized with the X-axis mirror 34. This digital signal is sent to a modulator 88 which, in turn, controls the laser 25.

Figure 9:
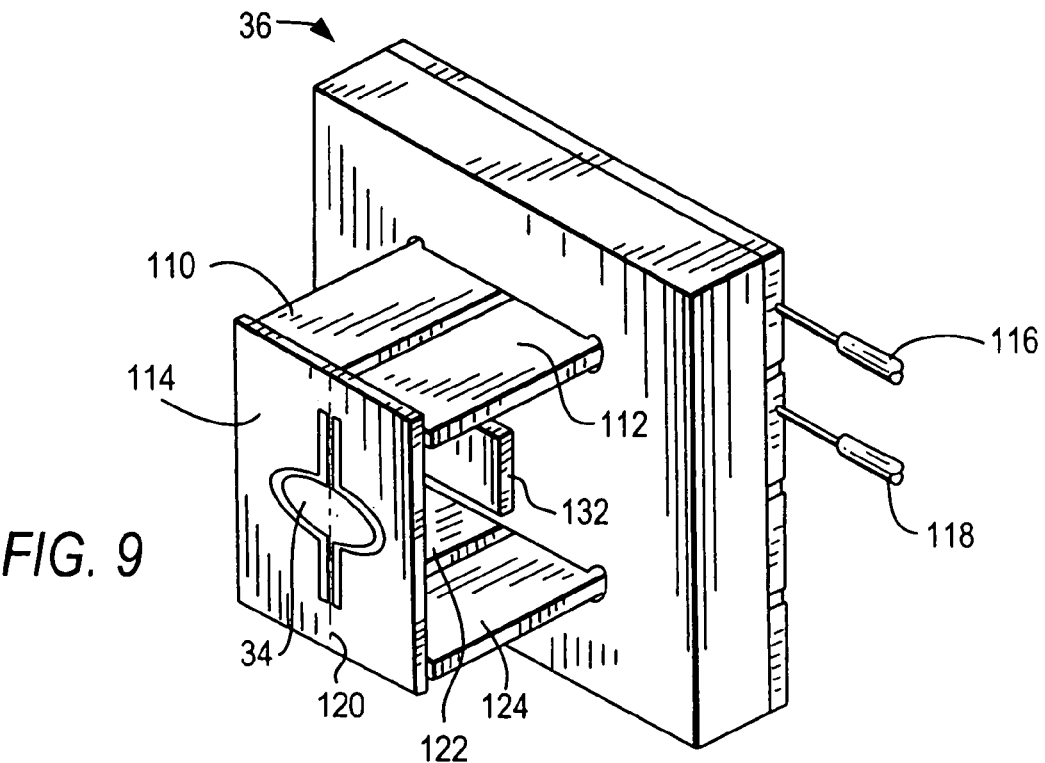
FIG. 9 is a front perspective view of a drive for the module of FIG. 2.
Figure 10:
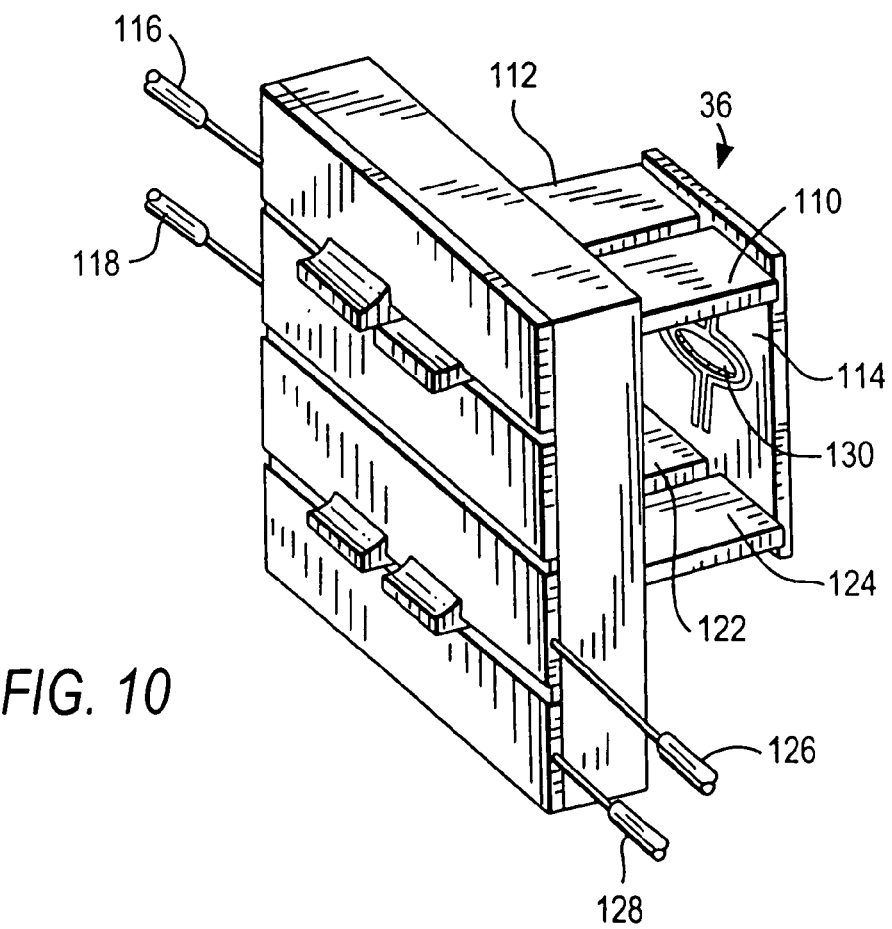
FIG. 10 is a rear perspective view of the drive of FIG. 9.

FIGS. 9-10 depict the inertial drive 36 in isolation. As described in the aforementioned U.S. patent application Ser. No. 10/387,878, filed Mar. 13, 2003, an upper pair of piezoelectric transducers 110, 112 contacts spaced-apart portions of a frame 114 above the scan mirror 34 and is electrically connected by wires 116, 118 to a periodic alternating voltage source. In use, the periodic source causes the transducers 110, 112 to alternatingly extend and contract in length, thereby causing the frame 114 to twist about a hinge axis 120. The scan mirror 34 is connected to the frame at opposite ends of the hinge axis and oscillates about the hinge axis at a resonant frequency.

A lower pair of piezoelectric transducers 122, 124 contacts spaced-apart locations of the frame 114 below the scan mirror 34. The transducers 122, 124 serve as feedback or pick-up mechanisms to monitor the oscillating movement of the frame and to generate and conduct electrical feedback signals along wires 126, 128 to a feedback control circuit.

However, vibrations induced by the transducers 110, 112 are detected by the transducers 122, 124 and tend to corrupt the feedback signals, thereby adversely affecting the projected image. Hence, the drive and pick-up mechanisms are preferably made different, for example, by not basing both mechanisms on the piezoelectric effect. One of the mechanisms is based on a different type of mechanism. For example, as shown in FIG. 10, a magnet 130 is jointly mounted behind the mirror 34 for joint oscillation therewith, and an electromagnetic feedback coil 132, as shown in FIG. 9, is mounted adjacent the magnet 130. The coil 132 senses the periodic electromagnetic field induced by the moving magnet and is immune from vibrations from the transducers 110, 112.

Figure 2:
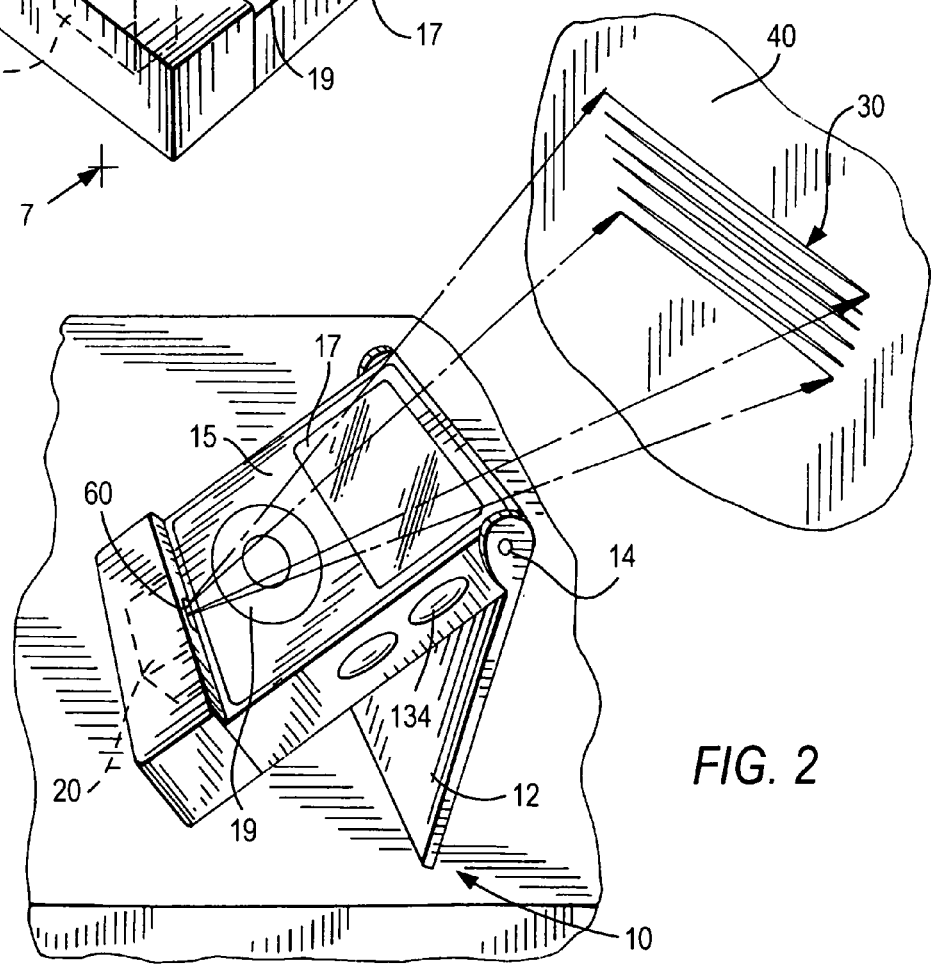
FIG. 2 is a perspective view of the arrangement of FIG. 1 for projecting an image at another image plane in accordance with this invention.

Returning to FIGS. 1-2, a screen 12 is pivotably mounted on the housing accessory 10 at pivots 14 to any one of a plurality of positions. For example, as shown in FIG. 1, the screen 12 lies in a vertical plane, and the bit-mapped image of the raster pattern 30 is projected through the window 60 by the module 20 onto the vertical screen, which defines an image plane. The electrical connection between the module 20 and the player 15 is via a dock connector, as described more fully in FIGS. 11-13. The screen 12 can be tilted back to form an obtuse angle with the horizontal for more convenient viewing from the front of the housing, thereby defining another image plane. Other angles, including acute angles, could also be employed. As shown in FIG. 2, the screen 12 can be pivoted to an angular position in which the screen supports the housing 10 in a tilted position, in which case, the image is not projected on the screen, but instead, is projected on a remote display surface, such as a wall 40, which defines still another image plane. An actuator 134 is manually depressed to initiate the image projection. Thus, in the embodiment of FIGS. 1-2, the image can be projected on-board the housing accessory 10 on the screen 12 in any one of a multitude of angular positions, or off-board the housing on the wall 40, or some other analogous display surface.

Figures 11, 12, 13:
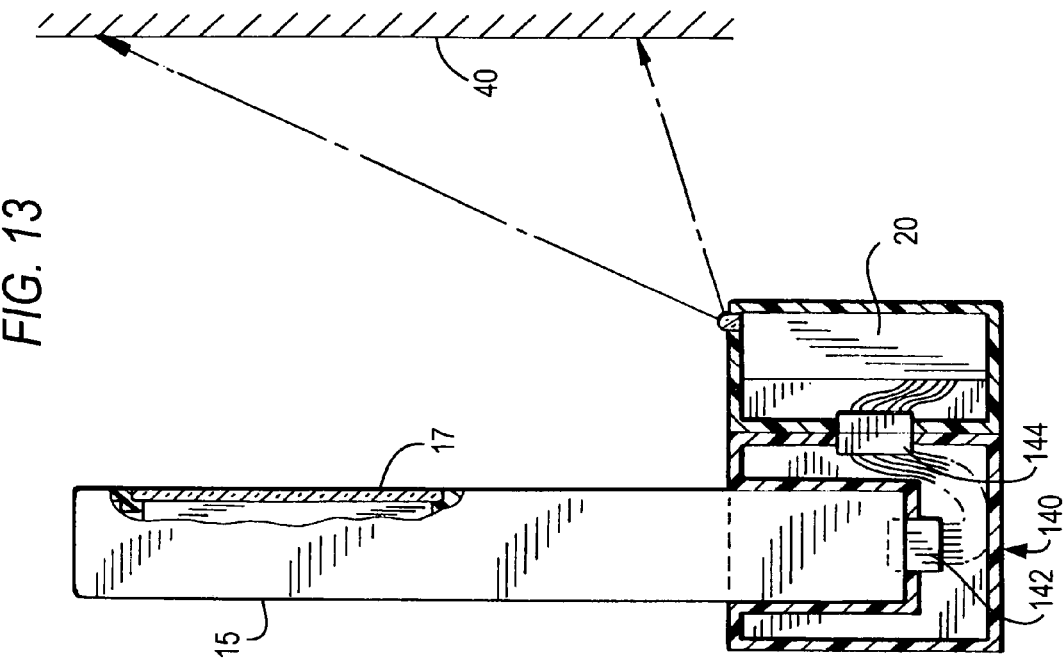
FIG. 11 is a part-sectional view of another arrangement in accordance with this invention for projecting an image at one side of a personal media player.
FIG. 12 is a part-sectional view of another arrangement in accordance with this invention for projecting an image at an opposite side of the player.
FIG. 13 is a part-sectional view of yet another arrangement in accordance with this arrangement for projecting an image remotely from the player.

Turning now to the embodiments of FIGS. 11-13, the player 15 is depicted in vertical positions in respective housing accessories 140. At the bottom of each player 15 is a first dock connector 142 for electromechanical connection with a second dock connector 144 with the module 20. In FIG. 11, the image is projected onto a front side wall of the player, especially on the display screen 17. In FIG. 12, the image is projected onto a rear side wall of the player over a larger display surface area. In FIG. 13, the image is projected onto a remote wall surface 40 which is preferably larger in size than the player.

In all of these embodiments, video signals supplied by the player are used to project the image on a desired display surface, especially one of larger size. The module 20 could in some applications be incorporated directly into the player itself for a more compact arrangement.

It will be understood that each of the elements described above, or two or more together, also may find a useful application in other types of constructions differing from the types described above.

While the invention has been illustrated and described as embodied in an image projection arrangement for projecting images at different image planes, especially using personal media players, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for projecting an image, comprising:
   a) a housing accessory having a window;
   b) an image projection module in the housing accessory for sweeping a pattern of scan lines through the window, each scan line having a number of pixels, and for causing selected pixels to be illuminated, and rendered visible, to produce the image; and
   c) a personal media player having a front side wall and a rear side wall and being connected to the housing accessory and the image projection module to supply image signals for the image to be projected by the module on one of the side walls.

2. The arrangement of claim 1, wherein the housing accessory has a compartment in which the personal media player is received.

3. The arrangement of claim 2, wherein the compartment is upwardly open, and wherein the personal media player is received in the compartment with an upright orientation.

4. The arrangement of claim 1, wherein the personal media player includes a display screen mounted thereon, and wherein the module projects the image with a size larger than the display screen.

5. The arrangement of claim 1, wherein the accessory has a dock connector for electro-mechanical connection with another dock connector on the personal media player.

6. A method of projecting an image, comprising the steps of:
   a) sweeping a pattern of scan lines through a window of a housing accessory using an image projection module, each scan line having a number of pixels, and causing selected pixels to be illuminated, and rendered visible, to produce the image;

b) using image signals for the image to be projected using a personal media player having a front side wall and a rear side wall; and c) connecting the personal media player to the housing accessory and the image projection module, and projecting the image on one of the side walls.

7. The method of claim 6, and the step of receiving the personal media player in a compartment of the housing accessory.

8. The method of claim 7, and configuring the compartment to be upwardly open, and wherein the personal media player is received in the compartment with an upright orientation.

9. The method of claim 6, wherein the personal media player includes a display screen mounted thereon, and the step of projecting the image with a size larger than the display screen.

10. The method of claim 6, wherein the connecting step is performed by electro-mechanically connecting a dock connector on the accessory with another dock connector on the personal media player.

* * * * *